United States Patent
Schuster et al.

(10) Patent No.: US 8,838,277 B2
(45) Date of Patent: Sep. 16, 2014

(54) SYSTEMS AND METHODS INVOLVING HEATING AND COOLING SYSTEM CONTROL

(75) Inventors: Don A. Schuster, Lindale, TX (US); Rajendra K. Shah, Indianapolis, IN (US); Adeyemi A. Adeptu, Indianapolis, IN (US); Sathish R. Das, Indianapolis, IN (US)

(73) Assignee: Carrier Corporation, Farmington, CT (US)

( * ) Notice: Subject to any disclaimer, the term of this patent is extended or adjusted under 35 U.S.C. 154(b) by 371 days.

(21) Appl. No.: 13/262,034

(22) PCT Filed: Mar. 30, 2010

(86) PCT No.: PCT/US2010/029148
§ 371 (c)(1),
(2), (4) Date: Sep. 29, 2011

(87) PCT Pub. No.: WO2010/114815
PCT Pub. Date: Oct. 7, 2010

(65) Prior Publication Data
US 2012/0010753 A1    Jan. 12, 2012

Related U.S. Application Data

(60) Provisional application No. 61/166,309, filed on Apr. 3, 2009.

(51) Int. Cl.
*G05B 21/00* (2006.01)
(52) U.S. Cl.
USPC .......................................................... 700/276

(58) Field of Classification Search
USPC .......................................................... 700/276
See application file for complete search history.

(56) References Cited

U.S. PATENT DOCUMENTS

| 4,333,316 A | * | 6/1982 | Stamp et al. ..................... 62/126 |
| 4,514,991 A | | 5/1985 | Zinsmeyer |
| 4,734,628 A | | 3/1988 | Bench et al. |
| 5,036,676 A | | 8/1991 | Dudley |

(Continued)

FOREIGN PATENT DOCUMENTS

| EP | 1867875 A2 | 12/2007 |
| JP | 92000039220 A | 2/2000 |

(Continued)

OTHER PUBLICATIONS

International Search Report; International Application No. PCT/US2010/029148; International Filing Date: Mar. 30, 2010; Date of Mailing Nov. 5, 2010.

(Continued)

*Primary Examiner* — Mohammad Ali
*Assistant Examiner* — Ziaul Karim
(74) *Attorney, Agent, or Firm* — Cantor Colburn LLP

(57) ABSTRACT

A method for controlling a system comprising, receiving system demand data (402), processing the system demand data (404), defining a first system operating parameter (404), receiving system condition data (406), associating the system condition data with an operating map function (406), determining whether the system condition data exceeds a threshold of the operating map function (408), and changing the first system operating parameter responsive to determining that the system condition data exceeds the threshold of the operating map function (411).

16 Claims, 4 Drawing Sheets

(56) References Cited

U.S. PATENT DOCUMENTS

| | | | |
|---|---|---|---|
| 5,054,294 A | 10/1991 | Dudley | |
| 5,628,201 A | 5/1997 | Bahel et al. | |
| 5,735,134 A | 4/1998 | Liu et al. | |
| 5,950,439 A | 9/1999 | Peterson et al. | |
| 6,047,557 A | 4/2000 | Pham et al. | |
| 6,238,188 B1 | 5/2001 | Lifson | |
| 6,408,635 B1 | 6/2002 | Pham et al. | |
| 6,499,308 B2 | 12/2002 | Inoue et al. | |
| 6,868,685 B2 | 3/2005 | Kim | |
| 7,797,080 B2 * | 9/2010 | Durham, III | 700/278 |
| 2006/0112702 A1 | 6/2006 | Martin et al. | |
| 2007/0012055 A1 | 1/2007 | Schenk et al. | |
| 2008/0264080 A1 | 10/2008 | Creed et al. | |
| 2008/0279708 A1 | 11/2008 | Heimonen et al. | |
| 2008/0315000 A1 | 12/2008 | Gorthala et al. | |
| 2010/0274395 A1 * | 10/2010 | Durham, III | 700/276 |

FOREIGN PATENT DOCUMENTS

| | | |
|---|---|---|
| JP | 2002327949 | 11/2002 |
| WO | WO2007027173 A1 | 3/2007 |
| WO | WO2010114815 A2 | 10/2010 |

OTHER PUBLICATIONS

International Search Report—Written Opinion; International Application No. PCT/US2010/029148; International Filing Date: Mar. 30, 2010; Date of Mailing: Nov. 5, 2010.

I. Seiji et al., English translation of Japanese Patent Publication No. 2000039220A, Publication Date: Feb. 8, 2000, Inventor: Inoue Seiji et al.

K. Shinichi, English translation of Japanese Patent Publication No. 2002327949, Publication Date: Nov. 15, 2002, Inventor: Kasahara Shinichi.

Notification Concerning Transmittal of International Preliminary Report on Patentability; International Application No. PCT/US2010/029148; International Filing Date: Apr. 3, 2009; Date of Mailing: Oct. 13, 2011.

International Preliminary Report on Patentability, International Application No. PCT/US2010/029148; International Filing Date: Mar. 30, 2010; Date of Issuance: Oct. 4, 2011.

\* cited by examiner

SYSTEMS AND METHODS INVOLVING HEATING AND COOLING SYSTEM CONTROL

BACKGROUND OF THE INVENTION

The subject matter disclosed herein relates to controlling heating and cooling systems and particularly to heating and cooling systems having subsystems that are dynamically adjustable such as a system described in U.S. Pat. No. 5,054, 294.

Heating and cooling systems that use vapor compression cycles typically include a variety of subsystems including, for example, a compressor, a condenser, an expansion valve, an evaporator, fans, a thermostat, and a system controller. Adjusting the operating parameters of a particular subsystem effects a change in operation of the other subsystems.

A method and system that allows the operating parameters of subsystems to be effectively controlled allowing an increase in the efficiency of heating and cooling systems is desired.

BRIEF DESCRIPTION OF THE INVENTION

According to one aspect of the invention, a method for controlling a system comprises, receiving system demand data, processing the system demand data, defining a first value of a first system operating parameter, receiving system condition data, associating the first value of the first system operating parameter with a first operating map function, determining whether the system condition data exceeds a threshold of the first operating map function, determining whether the system condition data exceeds a threshold of a second operating map function responsive to determining that the system condition data exceeds the threshold of the first operating map function, and changing the first value of the first system operating parameter to a second value associated with the second operating map function responsive to determining that the system condition data does not exceed the threshold of the second operating map function.

According to another aspect of the invention, a system comprises, a compressor, a sensor, a processor operative to receive system demand data, process the system demand data, define a first value of a first system operating parameter, receive system condition data from the sensor, associate the first value of the first system operating parameter with a first operating map function, determine whether the system condition data exceeds a threshold of the first operating map function, determine whether the system condition data exceeds a threshold of a second operating map function responsive to determining that the system condition data exceeds the threshold of the first operating map function, and change the first value of the first system operating parameter to a second value associated with the second operating map function responsive to determining that the system condition data exceeds the threshold of the second operating map function.

According to yet another aspect of the invention, a method for controlling a system comprises, receiving system demand data, processing the system demand data, defining a first system operating parameter, receiving system condition data, associating the system condition data with an operating map function, determining whether the system condition data exceeds a threshold of the operating map function, changing the first system operating parameter responsive to determining that the system condition data exceeds the threshold of the operating map function.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
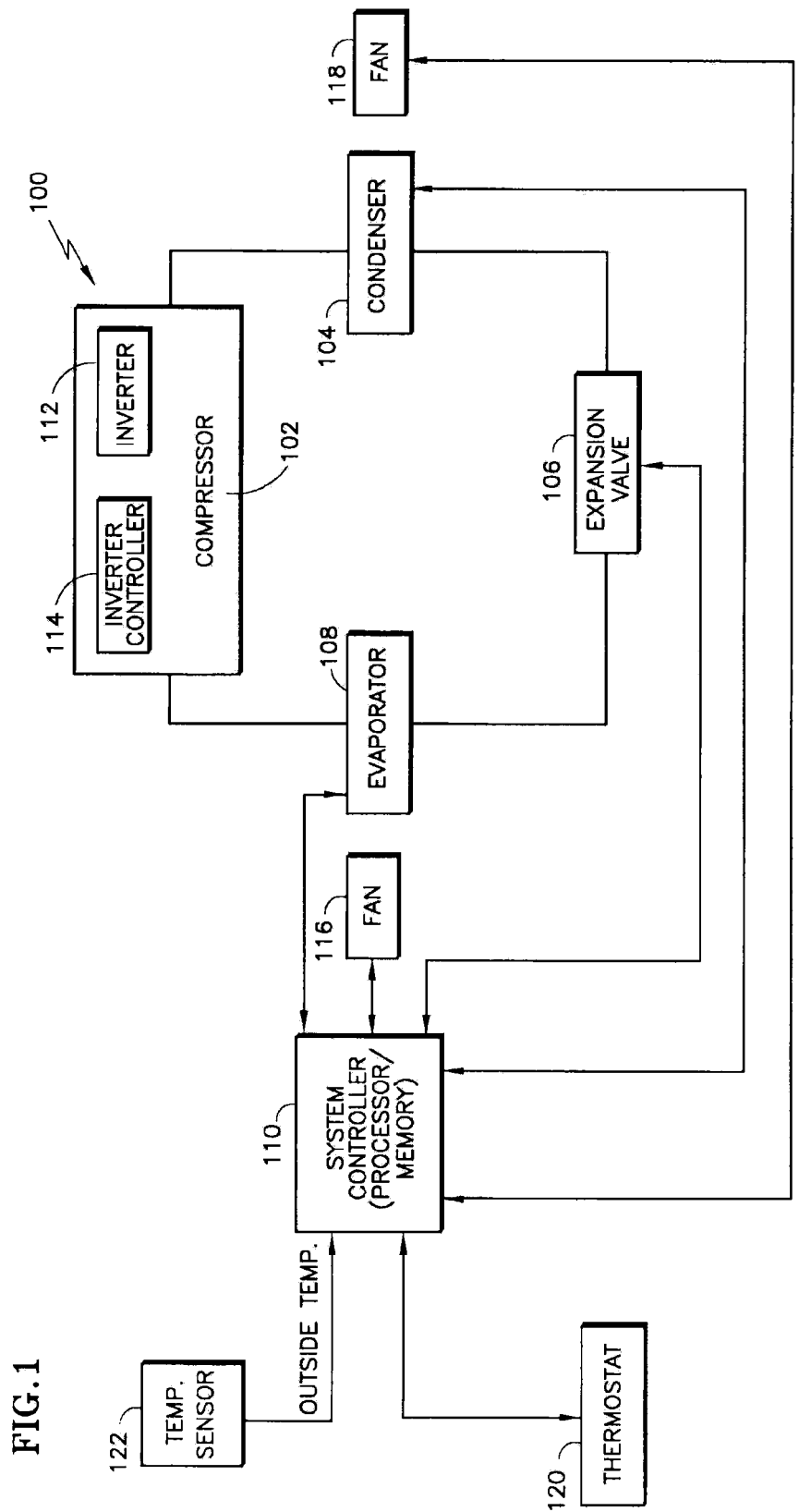
FIG. 1 is a block diagram of an exemplary embodiment of a heating and cooling system.

FIG. 1 illustrates a block diagram of an exemplary embodiment of a heating and cooling system 100. The system 100 includes a number of subsystems including, a compressor 102 having an inverter 112 and an inverter controller 114, a condenser 104, an expansion valve (EXV) 106, an evaporator 108, a fan 118, a fan 116, a thermostat 120, a temperature sensor 122, and a system controller 110. The system controller 110 may include, for example, a processor and memory.

Some embodiments of the system 100 may be optimized to either heat or cool a space, while other embodiment may be used for either function. A number of parameters effect the operation of the system 100, for example, the desired temperature (i.e., user demand) and the outside temperature. The user demand may be input by a user via the thermostat 120, while the outside temperature may be sensed by a temperature sensor 122. In a cooling system, for example, an increase in user demand or an increase in outside temperature increases the work performed by the system 100. A method and system that increases the efficiency of the system 100 is described below.

Dynamically adjusting the operating parameters of the subsystems of the system 100 may increase the reliability, effectiveness of meeting operating goals, and efficiency of the system 100. For example, the compressor subsystem 102 includes a variable speed compressor. The compressor 102 receives saturated vapor, compresses the saturated vapor, and discharges saturated vapor at a higher pressure. The compressor is electrically driven by the inverter 112 that is controlled by the inverter controller 114. The inverter controller 114 controls the speed (revolutions per minute (RPMs)) of the compressor 102. Varying the speed of the compressor 102 may offer an overall increase in the efficiency and a reduction of the energy consumption of the system 100. The inverter controller 114 may determine and collect a number of types of operating condition data of the inverter 112 and the compressor 102, for example, the inverter controller 114 may sense or calculate current used to drive the compressor 102, torque output, the speed of the compressor 102, evaporating temperature, condensing temperature, motor winding temperature, pump (scroll) temperature, and sump temperature. The design specifications of the compressor 102 define the thresholds of operating conditions for the compressor 102.

In operation, the inverter controller 114 may receive the motor winding temperature from a sensor. The inverter controller 114 may monitor the motor winding temperature and use logic to shutdown the compressor if the motor winding temperature exceeds a threshold of an operating condition. However, since shutting down the compressor 102 effectively shuts down the system 100, adjusting the operating parameters of the compressor 102 or the other subsystems may reduce the motor winding temperature and offers an alternative to a shutdown of the system 100. In the illustrated example of the system 100, the compressor 102 is variable speed, thus, if the motor winding temperature increases, the motor winding temperature may be reduced by, for example, lowering the speed of the compressor 102, or reducing the load on the compressor 102 by adjusting other parameters in the system 100, such as adjusting the EXV 106 orifice. The inverter controller 114 typically operates at a low level of control, in that, the inverter controller 114 processes sensed data to run the compressor 102 at a directed speed without exceeding the design limits of the compressor 102.

The system controller 110 operates at a higher level of control and receives and processes sensed data from a number of the system 100 subsystems. For example, the system controller 110 may receive the user demand from the thermostat 120 and send a signal to the inverter controller 114 to run the compressor 102 at a particular speed. If the inverter controller 114 determines that the compressor 102 is approaching a threshold limit of a system condition (sensed data), the inverter controller 114 may send a signal to the system controller 110. The system controller 110 may then adjust one or more operating parameters of the system 100, such as, for example, reducing the speed of the compressor 102 and/or adjusting the EXV 106.

Figure 2:
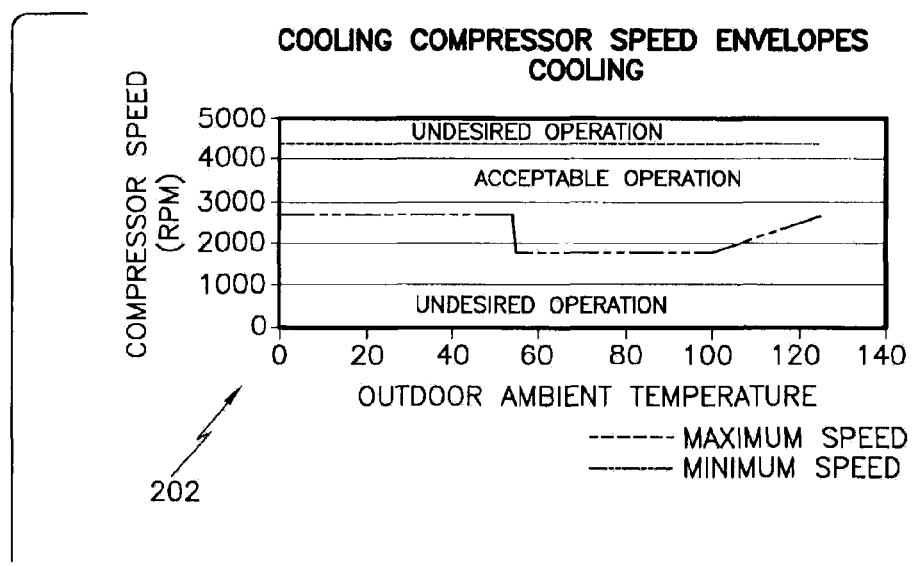
FIG. 2 includes graphs of exemplary embodiments of functions for controlling the system of FIG. 1.
Figure 2:
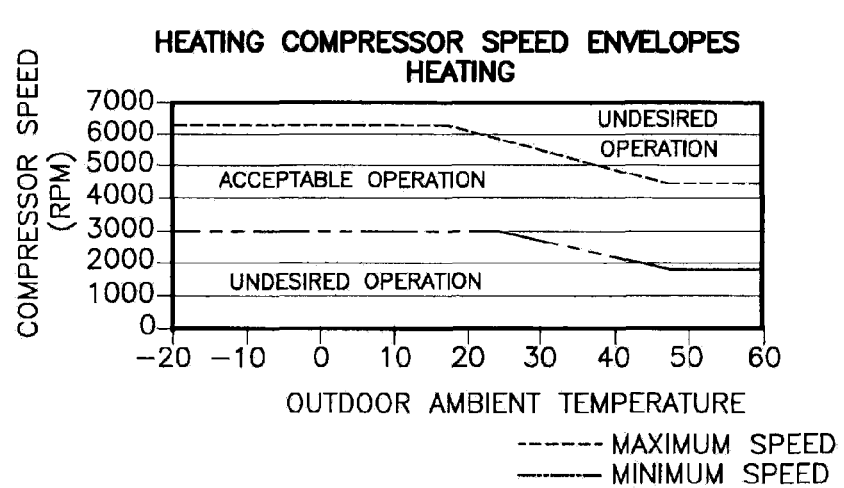

The variable speed compressor 102 operates over a range of speeds. As the speed of the compressor 102 varies, the operating condition thresholds of the compressor 102 may also vary. FIG. 2 includes graphs of exemplary embodiments of functions for controlling the system 100. The graphs 202 and 204 illustrate examples of functions of the operating envelopes for a compressor 102. The graph 202 is a function of outdoor ambient temperature and compressor speed for a cooling compressor operating in a cooling mode, and the graph 204 is a function of outdoor ambient temperature and compressor speed for a heating compressor operating in a heating mode. The normal operation portions of the graphs 202 and 204 are defined by the maximum and minimum compressor speeds that vary as a function of the outdoor ambient temperature. In operation, the system controller 110 receives the outside temperature and determines whether the compressor 102 is operating within the normal operation envelope. If the compressor 102 is not operating in the normal operation envelope, the system controller 110 may vary the speed of the compressor 102 by sending a control signal to the inverter controller 114. The functions illustrated in FIG. 2 are examples of functions for an example compressor 102. The functions may vary when a compressor 102 having different design specifications are used in the system 100. By varying the commanded operating parameters of the compressor, undesirable shutdowns of the compressor may be avoided.

Figure 3:
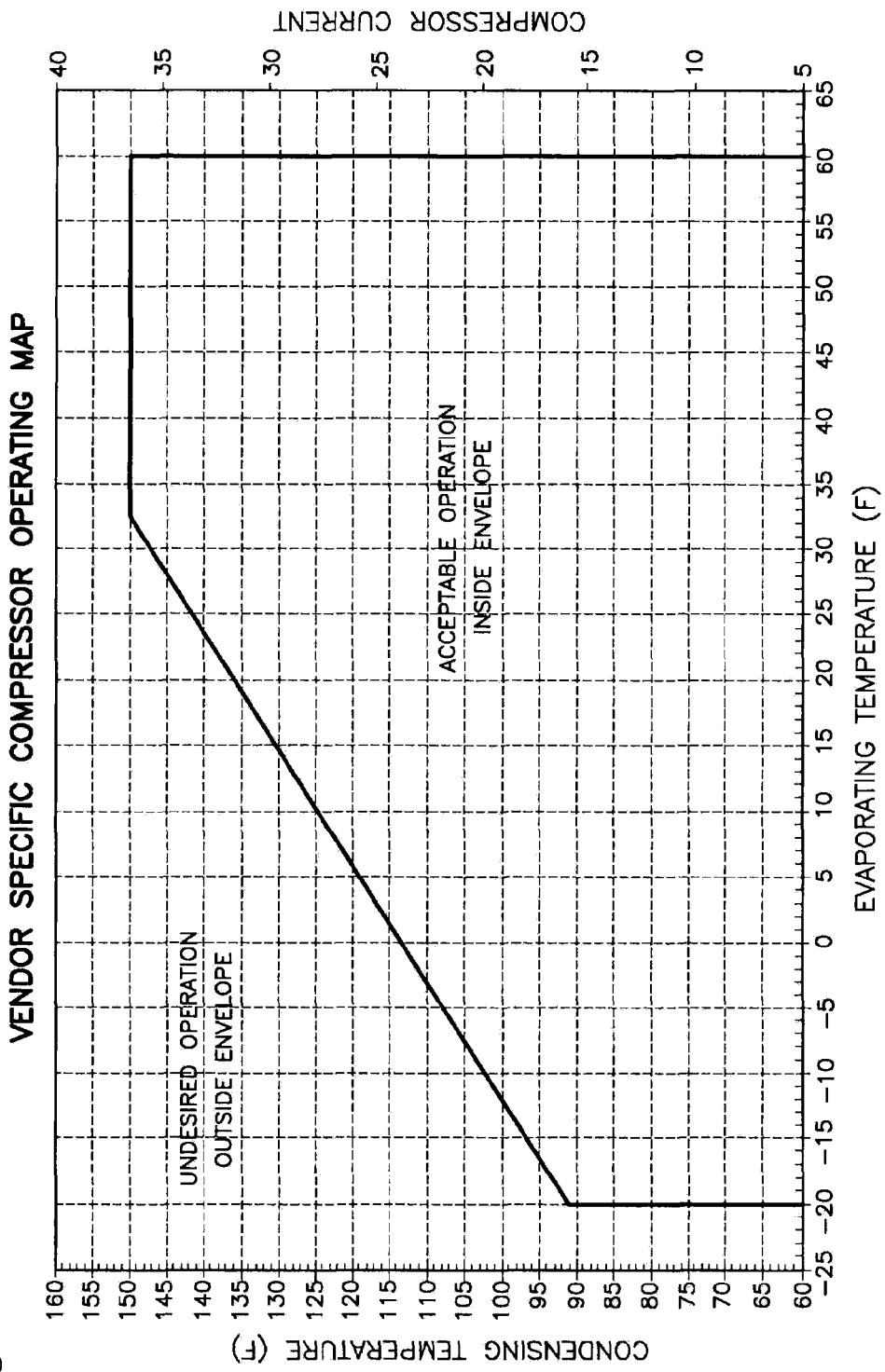
FIG. 3 is a graph of an exemplary embodiment of a function for controlling the system of FIG. 1.
Figure 4:
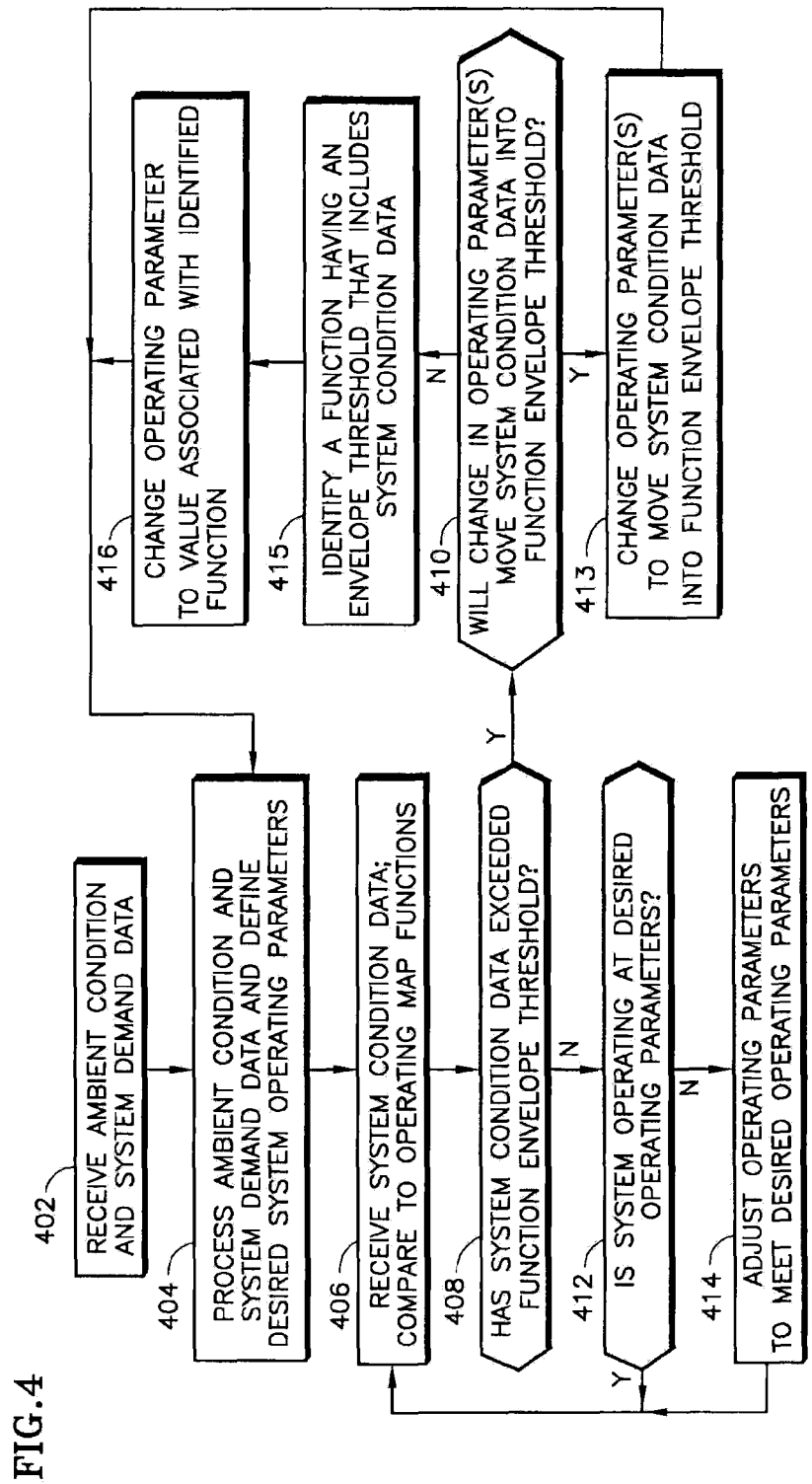
FIG. 4 is a block diagram of an exemplary embodiment of control logic used to control the system of FIG. 1.

Other system conditions may also be monitored by the system controller 110 to determine whether the compressor is operating within system condition thresholds. FIG. 3 illustrates a function graph operating map having an acceptable operation envelope. The envelope is defined by a function of condensing temperature, evaporating temperature, and compressor current. FIG. 3 illustrates an operating map at a particular compressor 102 operating speed. As the speed of the compressor 102 changes, the function may change—varying the operation envelope. In operation, for example, if the condensing temperature and evaporating temperature approach or fall outside the acceptable operation envelope, the system controller 110 may determine whether the condensing temperature and evaporating temperature may fall inside an acceptable operation envelope of the compressor 102 at a different compressor speed. Thus, the variable speed compressor 102 allows the system controller 110 to operate the compressor 102 within an acceptable operation envelope by changing the speed of the compressor 102. FIGS. 3 and 4 are examples of functions used to define operation envelopes. The system 100 may include a number of other functions of a variety of system conditions (such as, for example, compressor current, compressor torque, compressor scroll temperature, compressor sump temperature, inverter temperature, and motor temperature) that may be used to determine whether the system 100 is operating within specifications, and to adjust system parameters to maintain the operation of the system 100.

FIG. 4 illustrates a block diagram of an exemplary embodiment of control logic used to control the system 100. The control logic may be implemented by the system controller 110 and the inverter controller 114. In block 402 ambient condition and system demand data is received. Ambient condition may include, for example, the inside and outside temperatures, and system demand data may include, for example, a temperature desired by the user and input to the thermostat 120 (of FIG. 1). The ambient condition and system demand data are processed in block 404 to determine desired system operating parameters, such as, for example, compressor speed, airflow (fan speed), and expansion valve orifice dimension. In block 406, system condition data is received. The system condition data includes sensed system conditions. The received system condition data is compared to operating map functions. Block 408 determines whether any system condition data has met (or in alternate embodiments approaches) a threshold of the operating map function. In block 410, the system controller 110 determines whether one or more operating parameters may be changed to move the system condition data away from the threshold of the operating map function—keeping the system condition data within the acceptable operation envelope. If yes, in block 413, the operating parameter(s) are changed accordingly. If no, in block 415, the system controller 110 identifies another operating map function (stored in memory) having an envelope threshold that includes the present system condition data. If the system condition will not exceed the threshold envelope of an identified operating map function, the system controller 110 may change an operating parameter associated with the identified operating map function—changing the threshold envelope so that the system condition value falls into an acceptable threshold envelope in block 411. For example, the system controller 110 may apply the system condition data to operating map functions corresponding to a number of compressor 102 speeds. If the system controller 110 determines that the system condition data will be within the acceptable operation envelope of a different operating map function, the system controller 110 will direct the compressor 102 to change speed to the RPMs associated with the different operating map function. In block 412, the system controller 110 determines whether the system is operating at desired operating parameters. If the system is not operating at desired operating parameters, the operating parameters are adjusted to meet the desired operating parameters in block 414.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for controlling a system comprising:
   receiving system demand data;
   processing the system demand data;
   defining a first value of a first system operating parameter;
   receiving system condition data;
   associating the first value of the first system operating parameter with a first operating map function;
   determining whether the system condition data exceeds a threshold of the first operating map function;
   determining whether a change in the first value of the first system operating parameter will move the system condition data within a threshold of the first operating map function;
   when the change in the first value of the first system operating parameter will move the system condition data within the threshold of the first operating map function changing the first value of the first system operating parameter to move the system condition data within the threshold of the first operating map function; and
   when the change in the first value of the first system operating parameter will not move the system condition data within the threshold of the first operating map function, identifying a second operating map function for which the system condition data is within a threshold of the second operating map function and changing the first value of the first system operating parameter to a second value associated with the second operating map function such that the system condition data is within a threshold of the second operating map function.

2. The method of claim 1, wherein the method further includes:
   receiving ambient condition data; and
   processing the ambient condition data.

3. The method of claim 2, wherein the ambient condition data includes an outside temperature value.

4. The method of claim 1, wherein the method further includes:
   determining whether the system is operating at the first value of the first system operating parameter; and
   changing the first value of the first system operating parameter responsive to determining that the system is not operating at the value of the first system operating parameter and that the system condition data does not exceed the threshold of the operating map function.

5. The method of claim 1, wherein the system demand data is received from a thermostat.

6. The method of claim 1, wherein the first system operating parameter includes a compressor speed value.

7. The method of claim 1, wherein the first system operating parameter includes an airflow value.

8. The method of claim 1, wherein the first system operating parameter includes a position of an expansion valve.

9. The method of claim 1, wherein the operating map function is associated with a compressor speed value.

10. A system comprising:
    a compressor;
    a sensor; and
    a processor operative to implement:
    receiving system demand data:
    processing the system demand data;
    defining a first value of a first system operating parameter;
    receiving system condition data;
    associating the first value of the first system operating parameter with a first operating map function;
    determining whether the system condition data exceeds a threshold of the first operating map function;
    determining whether a change in the first value of the first system operating parameter will move the system condition data within a threshold of the first operating map function;
    when the change in the first value of the first system operating parameter will move the system condition data within the threshold of the first operating map function, changing the first value of the first system operating parameter to move the system condition data within the threshold of the first operating map function; and
    when the change in the first value of the first system operating parameter will not move the system condition data within the threshold of the first operating map function, identifying a second operating map function for which the system condition data is within a threshold of the second operating map function and changing the first value of the first system operating parameter to a second value associated with the second operating map function such that the system condition data is within a threshold of the second operating map function.

11. The system of claim 10, wherein the processor is further operative to receive ambient condition data, and process the ambient condition data.

12. The system of claim 10, wherein the system further includes a thermostat operative to send the system demand data to the processor.

13. The system of claim 10, wherein the first system operating parameter includes a compressor speed value.

14. The system of claim 10, wherein the first system operating parameter includes an airflow value.

15. The system of claim 10, wherein the first system operating parameter includes a position of an expansion valve.

16. The system of claim 10, wherein the operating map function is associated with a compressor speed value.

* * * * *